(12) United States Patent
Sato (10) Patent No.: US 7,802,138 B2
(45) Date of Patent: Sep. 21, 2010

(54) CONTROL METHOD FOR INFORMATION PROCESSING APPARATUS, INFORMATION PROCESSING APPARATUS, CONTROL PROGRAM FOR INFORMATION PROCESSING SYSTEM AND REDUNDANT COMPRISAL CONTROL APPARATUS

(75) Inventor: Keiji Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 980 days.

(21) Appl. No.: 11/236,616

(22) Filed: Sep. 28, 2005

(65) Prior Publication Data

US 2006/0212753 A1   Sep. 21, 2006

(30) Foreign Application Priority Data

Mar. 17, 2005   (JP) .............................. 2005-077760

(51) Int. Cl.
*G06F 11/00* (2006.01)
(52) U.S. Cl. .............................. 714/22; 714/14; 714/40
(58) Field of Classification Search .................. 714/14, 714/22, 40
See application file for complete search history.

(56) References Cited

U.S. PATENT DOCUMENTS

| | | | |
|---|---|---|---|
| 4,428,020 A * | 1/1984 | Blanchard, Jr. .............. 361/90 |
| 4,763,267 A | 8/1988 | Knight et al. |
| 5,036,455 A * | 7/1991 | Atwood ....................... 714/22 |
| 5,664,089 A | 9/1997 | Byers et al. |
| 6,191,499 B1 * | 2/2001 | Severson et al. .............. 307/31 |
| 7,237,148 B2 * | 6/2007 | Czajkowski et al. ........... 714/21 |
| 7,269,764 B2 * | 9/2007 | Dart et al. ..................... 714/54 |
| 2002/0077782 A1 | 6/2002 | Fruehling et al. |
| 2002/0152419 A1 * | 10/2002 | McLoughlin et al. ......... 714/11 |

FOREIGN PATENT DOCUMENTS

| | | |
|---|---|---|
| EP | 0 077 154 | 9/1982 |
| JP | 57-141731 | 9/1982 |
| JP | 3-266131 | 11/1991 |
| JP | 8-190494 | 7/1996 |
| JP | 10-143387 | 5/1998 |

OTHER PUBLICATIONS

European Search Report issued on Feb. 2, 2009 in corresponding European Patent Application 05254162.0.

* cited by examiner

*Primary Examiner*—Joshua A Lohn
(74) *Attorney, Agent, or Firm*—Staas & Halsey LLP (57) ABSTRACT

The present invention provides a control method for an information processing system, which includes a plurality of processing apparatuses performing a mutually equivalent operation, comprising the step of isolating the processing apparatus for which a fluctuation of power source voltage is relatively large, from the information processing system, if an error is not detected in each of the processing apparatuses and respective items of output information from the plurality of processing apparatuses raise a nonidentity.

7 Claims, 5 Drawing Sheets

| CONDITION | CPU0 ECC/Parity | CPU1 ECC/Parity | CPU 0/1 | CPU0 Power | CPU1 Power | AVAILABLE SERIES FOR OUTPUT DATA |
|---|---|---|---|---|---|---|
| S1 | good | good | IDENTITY | — | — | BOTH SERIES SOUND |
| S2 | good | good | NONIDENTITY | good | good | CANNOT BE JUDGED |
| S3 | good | good | NONIDENTITY | good | NG | SELECT 0-SERIES |
| S4 | good | good | NONIDENTITY | NG | good | SELECT 1-SERIES |
| S5 | good | good | NONIDENTITY | NG | NG | CANNOT BE JUDGED |
| S6 | good | NG | — | — | — | SELECT 0-SERIES |
| S7 | NG | good | — | — | — | SELECT 1-SERIES |
| S8 | NG | NG | — | — | — | CANNOT BE JUDGED |

F I G. 5

CONTROL METHOD FOR INFORMATION PROCESSING APPARATUS, INFORMATION PROCESSING APPARATUS, CONTROL PROGRAM FOR INFORMATION PROCESSING SYSTEM AND REDUNDANT COMPRISAL CONTROL APPARATUS

BACKGROUND OF THE INVENTION

1. Field of the Invention

The present invention relates to a control method for an information processing apparatus, an information processing apparatus, a control program for an information processing system and a redundant comprisal control apparatus, and in particular to an effective technique applied to an information processing system for improving failure resistance by making redundantly comprised hardware perform equivalent information processing.

2. Description of the Related Art

In a server system required to be highly reliable, information processing systems having mirroring functions are known to duplicate hardware such as processors so that both thereof execute the same information processing in order to improve failure resistance and, if an abnormality occurs in one processor, continue the information processing by using the input and output signals of the normally operating mirror processor.

In a case where output signals from both processors do not identify with each other, while no such error as described above (i.e., abnormality) has been detected in either processor operating in duplication, by an abnormality detection of the processors such as a parity error of input and output data, an ECC error, a timeout error in the processing operation of each processor, et cetera, a judgment criteria for identifying an abnormality of either of these processors does not exist. Consequently, the system needs to be stopped if the emphasis is placed on reliability but the availability of the system decreases. Such has been a technical challenge.

Meanwhile, an abnormality detection of power source generally takes a long time as compared to the operating speed of a logic circuit such as a processor. Due to this, if an abnormal system is to be detected by using a detection signal for power source abnormality involving a power source voltage drop, causing a processor to become inoperative, such a technique cannot remedy the above described failure of nonidentity output signals whereas both systems are seemingly normal.

For example, the patent document 1 has disclosed a high reliability computer, comprising first and second CPUs of the same configuration, a clock unit for supplying clock and reset signals of the same frequency and phase to these CPUs, a dual system adapt or (DSBA) for connecting these two CPUs with an input/output apparatus and an inter-block communication unit for exchanging CPU statuses, et cetera, between the two CPUs, in which the clock unit accomplishes synchronous execution of programs by the two CPUs and the dual system adapt or detaches one CPU, if it fails, to have the other non-failing CPU continue the processing.

That is the presiding DSBA monitors and compares the two CPUs and accesses the system such as memory, I/O, et cetera, by using the signal coming from the normally operating CPU of the two.

The DSBA confirms normality of the CPUs by performing an ECC check, parity check, et cetera, of signals transmitted from the dualized CPUs, respectively, and monitoring for an error signal for notification of an abnormality detected by the CPU therein. When detecting an abnormality, the DSBA shuts off the system judged to be abnormal to continue the processing by the normal CPU only.

If the two respective signals transmitted from the CPUs 0 and 1 raise a nonidentity, while no abnormality is detected for either CPU, the choice will be either stopping the system due to inability to continue, or continuing the processing by using either one of the two CPUs only.

In the system disclosed by the patent document 1, if a discrepancy occurs in the internal circuit caused by a failure of the internal semiconductor of the CPU or a software error, a built-in error detection circuit is capable of detecting it by a parity check, et cetera. Or, if an error occurs in the bus between the CPU and the DSBA, the error can be detected by a parity check or ECC check of the bus at the input to the DSBA or the CPU.

If there is an abnormality in the power source supplying the operating power for the CPU, however, causing the entire CPU to be affected so that the failure detection circuit, et cetera, within the CPU cannot function properly, and hence are incapable of outputting an error signal, then a possibility of outputting data to the controller as if the CPU were operating normally arises.

In the case of power source failure, as the supply voltage to the CPU falls below the lowest voltage for normal operation due to a drastic voltage drop, the CPU is considered to fall into a critically abnormal condition just a few milliseconds thereafter, and therefore it is possible to judge which CPU has become abnormal in an extended period of time. However, if mirroring is performed (i.e., dualizing CPU) by hardware, it is necessary to judge an error immediately at the time of the CPUs in two systems outputting different signals, not a few milliseconds thereafter. Therefore, it is necessary to detect a power source abnormality before a power source failure impacts on a malfunction of the CPU circuit.

In the meantime, CPUs have grown in recent years consuming large amounts of power, requiring a power supply dedicated to each CPU, and hence it has become necessary to take the effect of power supply failure into consideration in practicing mirroring.

Incidentally, a patent document 2 has disclosed a technique to equip a latch for retaining the output from a voltage abnormality detector which monitors the power source voltage at the processing apparatus in a data processing system including a plurality of processing apparatuses and a monitoring apparatus for monitoring these processing systems, enables confirmation of synchronism between a detection of voltage abnormality and malfunction of processing apparatus by confirming an abnormality of power source voltage by the monitoring apparatus referring to the latch when an abnormality is detected in the processing apparatus, and accomplish a clarification of the relation of cause and effect between the voltage abnormality and the abnormality of the processing apparatus.

While by using the technique disclosed by the patent document 2 it is possible to determine a cause-and-effect relationship between a voltage abnormality and respective malfunction of the processing apparatus, there is, however no disclosed technique for defining a failed CPU in such a fault that the processing results of a plurality of CPUs raise a nonidentity while a fault has not been detected for each CPU as described above.

Likewise, the patent document 3 has disclosed a multiplex system which comprises, in each of multiplexed processing apparatuses, a power source state retention unit for monitoring the input power at the own apparatus and memorizing a presence or absence of reapplying power in association with an instantaneous power outage, and a control unit for referring to a power source state retention unit comprised by other processing apparatus in response to detection of non-response in the other apparatus, judging whether or not the non-response has been caused by a restarting of the system in association with the instant power outage and resetting the state of the power source state retention unit comprised by the aforementioned other processing apparatus.

The patent document 3, as with the patent document 2, however, also does not disclose a technique for defining a failed CPU in which such a fault that the processing results of a plurality of CPUs raise a nonidentity while a fault has not been detected for each CPU as described above.

Additionally, the patent document 4 has disclosed a computer system which comprises a circuit for assembling the computer system, and a fault management system for detecting a fault state of each circuit independently and correlating each circuit with the fault state. The patent document 4, however, also does not disclose a technique for defining a failed CPU in such a fault that the processing results of a plurality of CPUs raise a nonidentity while a fault has not been detected for each CPU as described above.

[Patent document 1] Laid-open Japanese patent application publication No. 8-190494

[Patent document 2] Laid-open Japanese patent application publication No. Sho 57-141731

[Patent document 3] Laid-open Japanese patent application publication No. 3-266131

[Patent document 4] Laid-open Japanese patent application publication No. 10-143387(U.S. Pat. No. 6,000,040)

SUMMARY OF THE INVENTION

The purpose of the present invention is to improve the availability of an information processing system under such conditions that the output results of a plurality of processing apparatuses raise a nonidentity though a fault has not been detected for each processing apparatus in the information processing system, with the aim of providing high reliability by making a redundantly comprised plurality of processing apparatuses perform an equivalent operation.

A first aspect of the present invention is to provide a control method for an information processing system, which includes a plurality of processing apparatuses performing a mutually equivalent operation, comprising the step of isolating the processing apparatus for which a fluctuation of the power source voltage is relatively large, from the information processing system, if an error is not detected in each of the processing apparatuses and respective items of output information from the plurality of processing apparatuses raise a nonidentity.

A second aspect of the present invention is to provide a control method for an information processing system, which furnishes a power source monitor unit with a plurality of processing apparatuses performing a mutually equivalent operation, comprising the step of interpreting that a fault has occurred in a processing apparatus for which a fluctuation of power source voltage is relatively large if respective items of output data from the plurality of processing apparatuses raise a nonidentity whereas an error has not been detected in either of the processing apparatuses.

A third aspect of the present invention is to provide a control method for an information processing system, which furnishes a voltage monitor unit for detecting a fluctuation of power source voltage from a threshold value for each of a plurality of first and second processing apparatuses and outputting it as a voltage monitor signal in the information processing system comprising the plurality of the first and second processing apparatuses performing a mutually equivalent processing, comprising the step of referring to the voltage monitor signal for each of the first and second processing apparatuses output from the voltage monitor unit and isolating the first or second processing apparatuses for which a power source voltage indicates an abnormality, if respective items of output data from the first and second processing apparatuses raise a nonidentity whereas an error has not been detected in either of the first or second processing apparatuses.

A fourth aspect of the present invention is to provide a control method for an information processing system, which makes a plurality of first and second processing apparatuses perform the same information processing to use either the first or second processing apparatuses with a non-failing operating state, comprising a first step for judging whether or not error check items relating to the first and second processing apparatuses other than power source voltages are normal; a second step for judging whether or not respective outputs from the first and second processing apparatuses raise an identity if the error check items indicate normality; and a third step for using either the first or second processing apparatus indicating a result of "no abnormality" based on an error judgment according to a fluctuation value of power source voltage for each of the first and second processing apparatus if the respective outputs raise a nonidentity in the second step.

A fifth aspect of the present invention is to provide an information processing system, comprising a plurality of a first and second processing apparatus; a voltage monitor unit for monitoring fluctuation of power source voltage for each of the first and second processing apparatuses; and a selection unit for switching between the first and second processing apparatuses to use, wherein the selection unit comprises a first judgment unit for judging whether or not error check items relating to the first and second processing apparatuses other than power source voltages are normal; a second judgment unit for judging whether or not respective outputs from the first and second processing apparatuses raise an identity if the error check items indicate normality; and a third judgment unit for selecting either the first or second processing apparatus indicating a result of "no abnormality" based on an error judgment according to a fluctuation value of power source voltage for each of the first and second processing apparatus if the second judgment unit judges that the respective outputs have raised a nonidentity.

A sixth aspect of the present invention is to provide a signal for carrying a control program for an information processing system comprising a plurality of first and second processing apparatuses and a selection unit for switching between the first and second processing apparatuses to use, wherein the control program makes the selection unit execute the first step for judging whether or not error check items relating to the first and second processing apparatuses other than power source voltages are normal; the second step for judging whether or not respective outputs from the first and second processing apparatuses raise an identity if the error check items indicate normality; and the third step for using either the first or second processing apparatuses indicating a result of "no abnormality" based on an error judgment according to a fluctuation value of power source voltage for each of the first and second processing apparatus if the respective outputs raise a nonidentity in the second step.

A seventh aspect of the present invention is to provide a redundant comprisal control apparatus, for monitoring a plurality of processing apparatuses equipped redundantly within an information processing system and performing an operation for isolating the faulty processing apparatus therefrom, comprising a control logic for judging that a fault has occurred in a processing apparatus for which a fluctuation of power source voltage is relatively large if respective items of output data from the plurality of processing apparatuses raise a nonidentity whereas an error has not been detected in either of the processing apparatuses.

According to the above described present invention, in an information processing system which makes a redundantly comprised plurality of processing apparatuses perform a mutually equivalent operation and continues the processing by using other non-failing processing apparatus if a fault occurs in one processing apparatus, even if the situation is such that it is difficult to determine the fault conventionally such as when respective processing results of the processing apparatuses raise a nonidentity though an error has not been detected in either of the processing apparatuses, it is possible to interpret that a fault has occurred in a processing apparatus for which a fluctuation of power source voltage is relatively large, isolate the aforementioned processing apparatus from the information processing system and continue the system operation by using the other non-failing processing apparatus, thereby improving the availability of the information processing system.

DESCRIPTION OF THE PREFERRED EMBODIMENTS

The following is a detailed description of the preferred embodiment of the present invention referring to the accompanying drawings.

Figure 1:
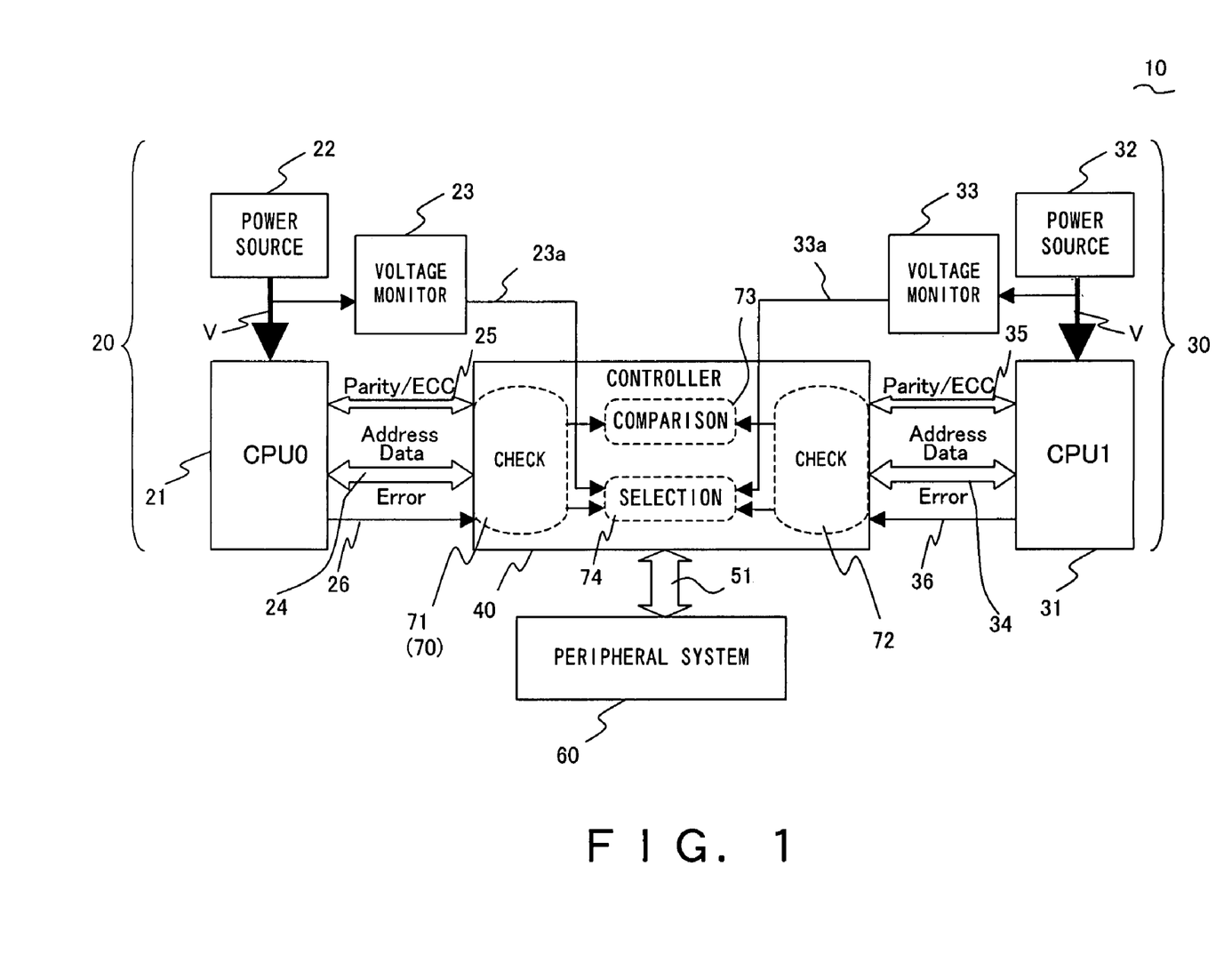
FIG. 1 is a block diagram showing an example configuration of an information processing system as an embodiment according to the present invention.
Figure 2:
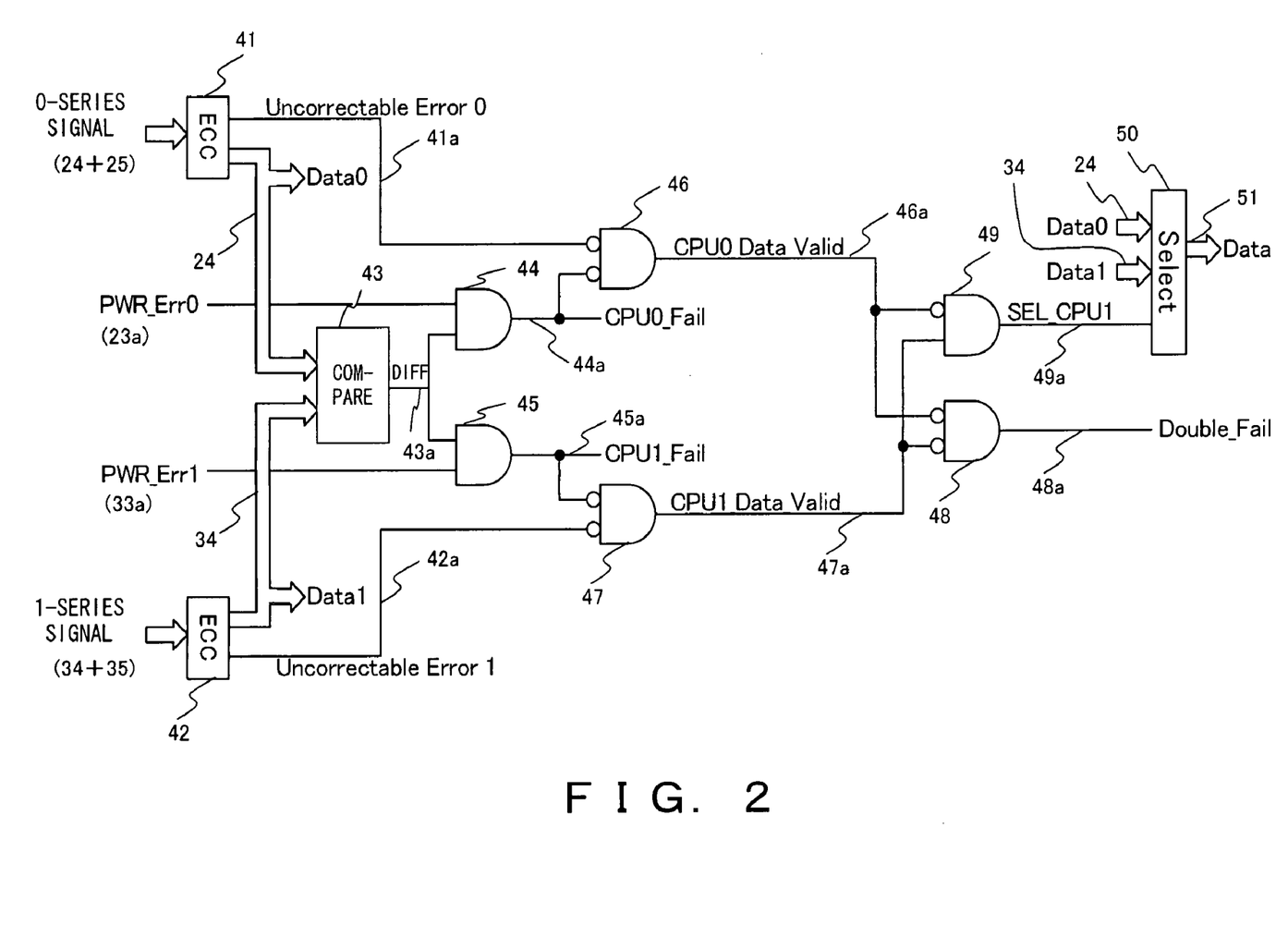
FIG. 2 is a block diagram showing an example of an internal comprisal of a redundant comprisal control circuit constituting an information processing system as an embodiment according to the present invention.
Figure 3:
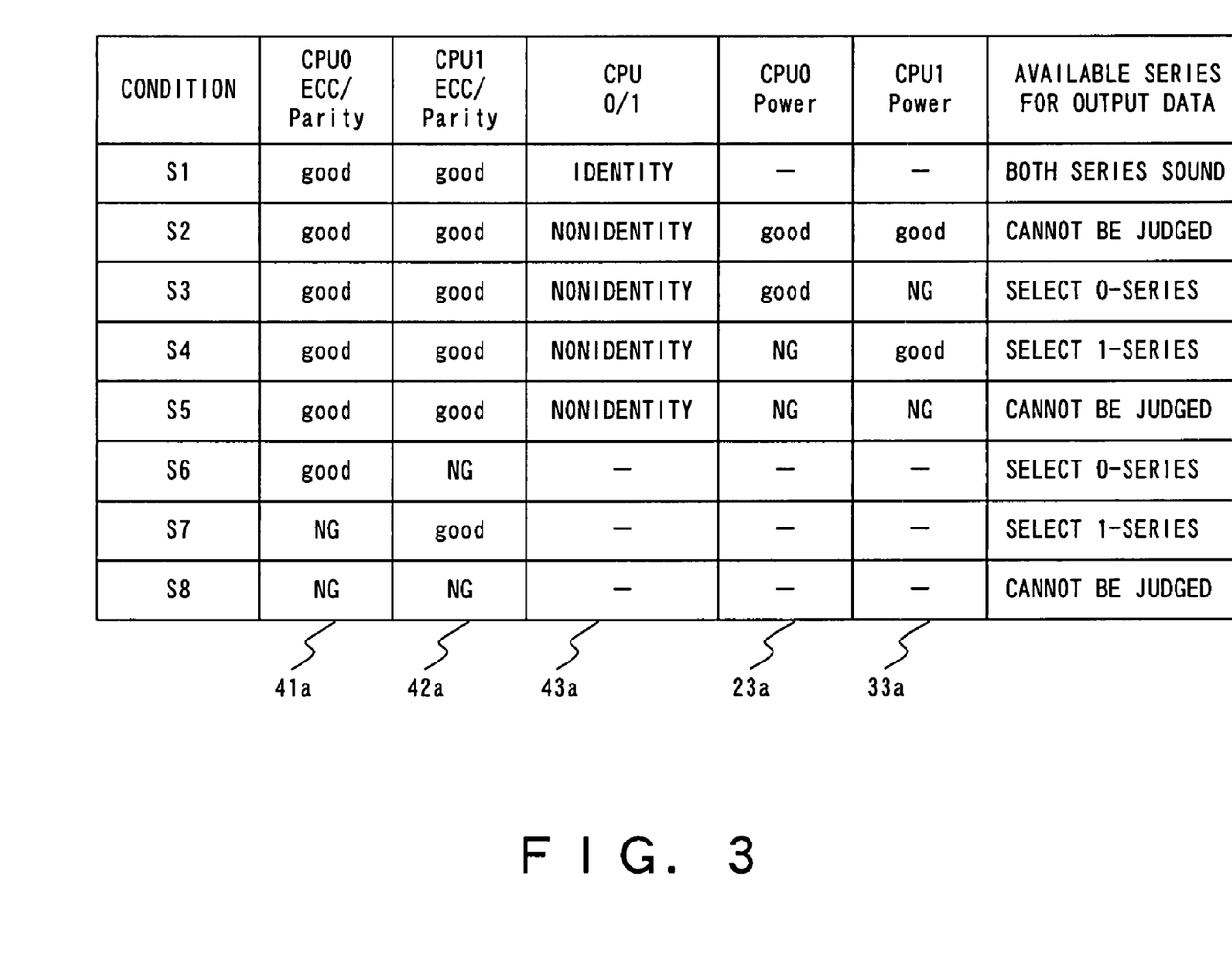
FIG. 3 describes an example of judgment operation in the redundant comprisal control circuit as an embodiment according to the present invention.
Figure 4:
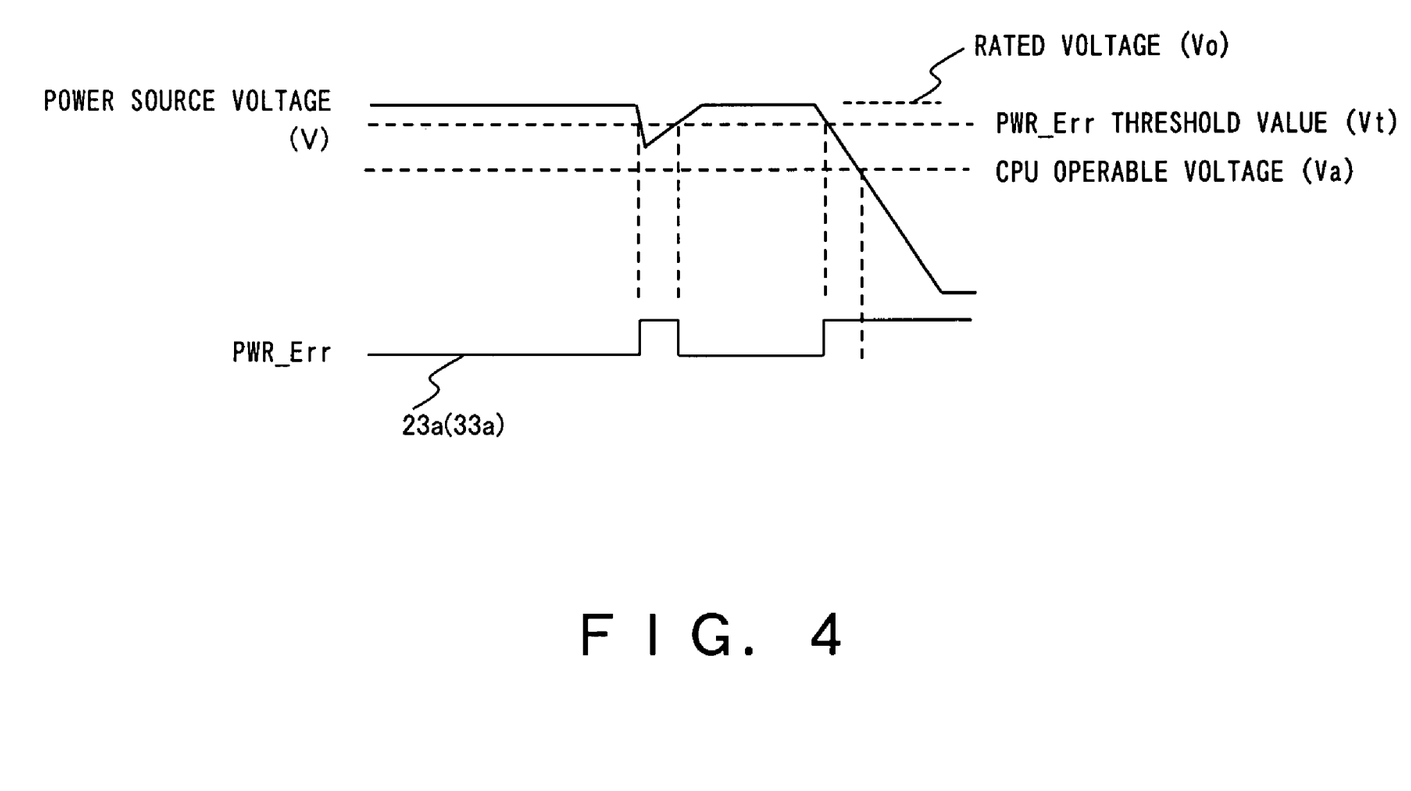
FIG. 4 is a diagram showing an example of a judgment operation for a power source voltage in the redundant comprisal control circuit as an embodiment according to the present invention.
Figure 5:
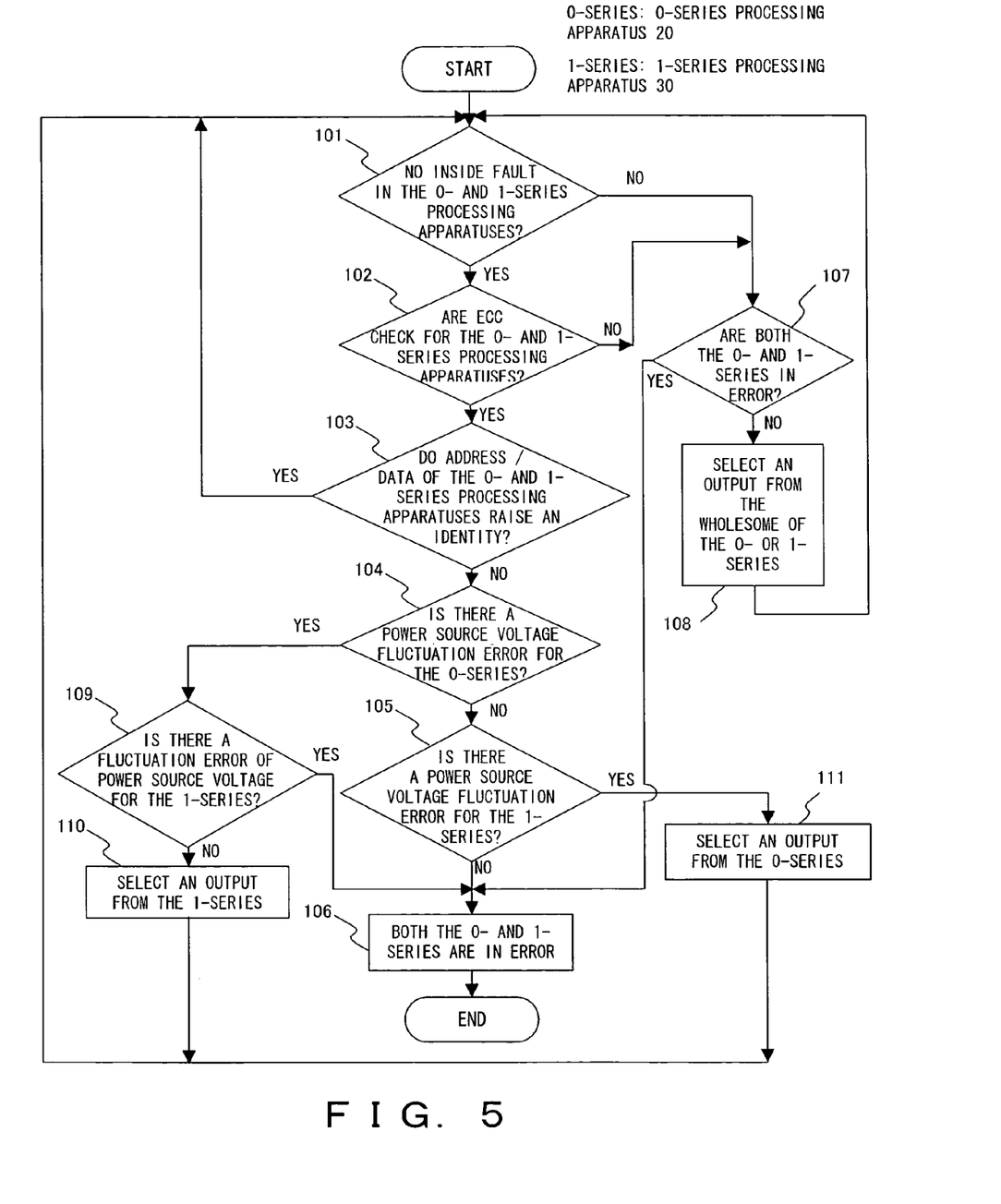
FIG. 5 is a flow chart showing an example of a judgment operation in the redundant comprisal control circuit as an embodiment according to the present invention.

FIG. 1 is a block diagram showing an example configuration of an information processing system as an embodiment according to the present invention; FIG. 2 is a block diagram showing an example of an internal comprisal of a redundant comprisal control circuit constituting an information processing system 10 according the present embodiment; FIG. 3 describes an example of judgment operation in the redundant comprisal control circuit according the present embodiment; FIG. 4 is a diagram showing an example of a judgment operation for a power source voltage in the redundant comprisal control circuit according the present embodiment; and FIG. 5 is a flow chart showing an example of a judgment operation in the redundant comprisal control circuit according the present embodiment.

The information processing system 10 according to the present embodiment comprises a plurality of 0-series processing apparatuses 20 (i.e., first processing apparatus) and of 1-series processing apparatuses 30 (i.e., second processing apparatus), a redundant comprisal control apparatus 40 (i.e., selection unit), and a peripheral system 60.

The peripheral system 60 includes a storage apparatus, an input/output apparatus, and communication equipment, for example.

The 0-series processing apparatus 20 and 1-series processing apparatus 30 are mutually made up of the same configuration and mutually perform the same operation. And the redundant comprisal control apparatus 40 monitors the operations of the 0-series processing apparatus 20 and 1-series processing apparatus 30 mutually performing the same operation and connects either one of the two with the peripheral system 60. This will enable the information processing system 10 to continue the information processing by connecting one of the 0-series processing apparatus 20 and 1-series processing apparatus 30 with the peripheral system 60 if one thereof fails.

The 0-series processing apparatus 20 comprises a central processing unit 21 (i.e., CPU 0), a power source 22 and a power source monitor apparatus 23.

The central processing unit 21 exchanges input/output information 24 with the redundant comprisal control apparatus 40. The input/output information 24 is added to error check data 25 such as an ECC (Error Correcting Code) and parity, and error detection and correction of the input/output information 24 inside the redundant comprisal control apparatus 40 is performed.

The central processing unit 21 has the functionality of detecting an internal fault occurring within its own apparatus, with the detection result of the internal fault being transmitted to the redundant comprisal control apparatus 40 as an internal error signal 26.

The 1-series processing apparatus 30 comprises a central processing unit 31 (i.e., CPU 1), a power source 32 and a power source monitor apparatus 33.

The central processing unit 31 exchanges input/output information 34 with the redundant comprisal control apparatus 40. The input/output information 24 is added by error check data 35 such as an ECC (Error Correcting Code) and parity, and error detection and correction of the input/output information 34 inside the redundant comprisal control apparatus 40 is performed.

The central processing unit 31 has the functionality of detecting an internal fault occurring within its own apparatus, with the detection result of the internal fault being transmitted to the redundant comprisal control apparatus 40 as an internal error signal 36.

The central processing unit 21 operates on a power source voltage V supplied from the power source 22. The present embodiment furnishes the power source monitor apparatus 23 for monitoring fluctuations of the power source voltage V supplied from the power source 22. The power source monitor apparatus 23, comprising a detection circuit (not shown) for detecting a change of the power source voltage V with high speed and sensitivity, outputs a power source error signal 23a to the redundant comprisal control apparatus 40 if the power source voltage V supplied by the power source 22 to the central processing unit 21 goes below a CPU operable voltage Va as described later.

Likewise, the central processing unit 31 operates on a power source voltage V supplied by the power source 32. The present embodiment furnishes the power source monitor apparatus 33 for monitoring a fluctuation of power source voltage V supplied by the power source 32. The power source monitor apparatus 33, comprising a detection circuit (not shown) for detecting a change of the power source voltage V with high speed and sensitivity, outputs a power source error signal 33a to the redundant comprisal control apparatus 40 if the power source voltage V supplied by the power source 32 to the central processing unit 31 goes below a CPU operable voltage Va as described later.

The next description is of an example comprisal of a redundant comprisal control apparatus 40 in reference to FIG. 2. The redundant comprisal control apparatus 40 according to the present embodiment comprises error detection/correction circuits 41 and 42, a data comparator 43, AND circuits 44 through 49 and a selector 50. Note that "1" signifies "true" and "0" signifies "false" in the following description of each signal shown by FIG. 2.

Note also that judgments for the internal error signal 26 and internal error signal 36 are omitted in the logic circuit shown by FIG. 2. That is because the internal error signal 26 and the internal error signal 36 indicate more significant errors inside the central processing unit 21 and the central processing unit 31, respectively, and accordingly the central processing unit 21 or the central processing unit 31 if detecting the internal error signal 26 or the internal error signal 36, respectively, will be isolated unconditionally from the information processing system 10.

The error detection/correction circuit 41 detects and corrects input/output information 24 errors by using the error check data 25 redundantly added to the input/output information 24 being exchanged with the central processing unit 21. If this processing of error detection and correction detects an uncorrectable error, the error detection/correction circuit 41 outputs an uncorrectable error detection signal 41a to the AND circuit 46.

The error detection/correction circuit 42 detects and corrects input/output information 34 errors by using the error check data 35 redundantly added to the input/output information 34 being exchanged with the central processing unit 31. If this processing of error detection and correction detects an uncorrectable error, the error detection/correction circuit 42 outputs an uncorrectable error detection signal 42a to the AND circuit 47.

The data comparator 43 compares the input/output information 24 input from the central processing unit 21 with the input/output information 34 input from the central processing unit 31 and outputs a data nonidentity detection signal 43a to the AND circuits 44 and 45, if the two items of information raise a nonidentity.

The AND circuit 44 performs an AND operation of the power source error signal 23a (PWR_Err 0) input from the power source monitor apparatus 23 and the data nonidentity detection signal 43a input from the data comparator 43 to output a 0-series fault prediction signal 44a.

The AND circuit 45 performs an AND operation of the power source error signal 33a (PWR_Err 1) input from the power source monitor apparatus 33 and the data nonidentity detection signal 43a input from the data comparator 43 to output a 1-series fault prediction signal 45a.

The AND circuit 46 performs an AND operation of the logic inversion signal of the uncorrectable error detection signal 41a input from the error detection/correction circuit 41 and that of the 0-series fault prediction signal 44a to output a 0-series data valid signal 46a.

The AND circuit 47 performs an AND operation of the logic inversion signal of the uncorrectable error detection signal 42a input from the error detection/correction circuit 42 and that of the 1-series fault prediction signal 45a to output a 1-series data valid signal 47a.

The AND circuit 48 performs an AND operation of the logic inversion signal of the 0-series data valid signal 46a input from the AND circuit 46 and that of the 1-series data valid signal 47a input from the AND circuit 47 to output a double_fail signal 48a.

The AND circuit 49 performs an AND operation of the logic inversion signal of the 0-series data valid signal 46a input from the AND circuit 46 and the 1-series data valid signal 47a input from the AND circuit 47 to output a data selection control signal 49a to the selector 50.

The selector 50 selects the input/output information 34 relating to the 1-series processing apparatus 30 if the data selection control signal 49a indicates true (i.e., "1"), while selecting the input/output information 24 relating to the 0-series processing apparatus 20 if the data selection control signal 49a indicates false (i.e., "0").

FIG. 3 shows judgment processing in the redundant comprisal control apparatus 40 corresponding to respective error occurrence conditions (i.e., conditions S1 through S8) in a plurality of 0-series processing apparatuses 20 and 1-series processing apparatuses 30 performing a mutually equivalent operation.

That is, the logic circuit of the redundant comprisal control apparatus 40 exemplified by FIG. 2 judges as to which of the 0-series processing apparatus 20 or 1-series processing apparatus 30 to select, if the result of comparing between the input/output information 24 and input/output information 34 corresponding to the 0-series processing apparatus 20 and 1-series processing apparatus 30, respectively, raises a nonidentity (i.e., a data nonidentity detection signal 43a is true) while an error has not occurred in either of the aforementioned apparatuses, among those error conditions S1 through S8 as exemplified by FIG. 3.

The following description is of an example operation of the information processing system 10 according to the present embodiment.

As described above, the present embodiment lets the power source monitor apparatus 23 equipped in the power source 22 for supplying power to the central processing unit 21 and the power source monitor apparatus 33 equipped in the power source 32 for supplying power to the central processing unit 31 input a power source error signal 23a and a power source error signal 33a, respectively, to the redundant comprisal control apparatus 40.

The power source monitor apparatuses 23 and 33 are required to detect a voltage abnormality before either of the central processing units 21 and 31 malfunction due to a drop of power source voltage V, and therefore is comprised by components which are capable of high speed operation and is set up with high threshold values.

Specifically, as shown in FIG. 4, the threshold value for abnormality judgment nominated by a voltage fluctuation detection threshold value Vt set up for the power source monitor apparatuses 23 and 33 is determined between the rated voltage V0 and the CPU operable voltage Va and biased toward the rated voltage V0, i.e., at a relatively higher value in the present embodiment.

In the meantime, if the voltage fluctuation detection threshold value Vt is set close to the rated voltage V0, the power source monitor apparatuses 23 and 33 become highly sensitive so as to react to slight fluctuations of the power source voltage V at the power sources 22 and 23, respectively, caused by load fluctuation in the central processing units 21 and 31, respectively.

Accordingly, the present embodiment does not allow such processing as to isolate either of the multiply comprised 0-series processing apparatuses 20 or 1-series processing apparatuses 30 directly by using power source error signals 23a or 33a output from the power source monitor apparatuses 23 or 33, respectively.

In other words, the redundant comprisal control apparatus 40 puts higher priority on a parity check or ECC check of the input/output information 24 and 34 from each of the 0-series processing apparatuses 20 and 1-series processing apparatus 30, respectively, and the internal error signal 26 (i.e., error) therefrom, and, only if the input/output information 24 relating to the 0-series processing apparatus 20 and input/output information 34 relating to the 1-series processing apparatus 30 raise a nonidentity while no abnormality has been detected in the aforementioned series of checks, does it refer to the power source error signals 23a and 33a output from the power source monitor apparatuses 23 and 33, respectively, perform the processing of isolating either the 0-series processing apparatus 20 or the 1-series processing apparatus 30, for which the power source error signals 23a or 33a, respectively, indicate an abnormality, from the information processing system 10 and continue the information processing by using the other 0-series processing apparatus 20 or 1-series processing apparatus 30.

Therefore, if the input/output information 24 from the 0-series processing apparatus 20 and the input/output information 34 from the 1-series processing apparatus 30 raise an identity, the power source error signals 23a and 33a will be ignored.

The above described operation of the logic circuit comprised by the redundant comprisal control apparatus 40 exemplified by FIG. 2 can also be accomplished by software such as a control program 70 for controlling the redundant comprisal control apparatus 40, et cetera. That is, the control program 70 includes check processing logic 71 and 72 for monitoring for faults in each of the central processing units 21 and 31, comparison logic 73 for comparing the input/output information 24 relating to the 0-series processing apparatus 20 with the input/output information 34 relating to the 1-series processing apparatus 30, and selection logic 74 for selecting either of the input/output information 24 or 34 to use as input/output data 51.

The following is a description of the operation of the above described control program 70 referring to the flow chart shown by FIG. 5.

The first process is to refer to the internal error signals 26 and 36 of each of the central processing units 21 and 31, respectively, to judge whether or not either of the two indicates a fault (step 101) and, if neither is at fault, further judge the ECC and parity check results of the input/output information 24 and 34 relating to the central processing units 21 and 31, respectively (step 102).

If there is no abnormality in either series, judge whether or not the input/output information 24 and 34 relating to the 0-series processing apparatus 20 and 1-series processing apparatus 30, respectively, raise an identity (step 103) and, if both items of information raise the identity, meaning no abnormality, return to the step 101 (i.e., condition S1).

On the other hand if the both items of information raise a nonidentity in the step 103 ("no" for the judgment), that is, if the input/output information 24 from the 0-series processing apparatus 20 and the input/output information 34 from the 1-series processing apparatus 30 raise a nonidentity whereas no fault has been detected in either of the two series (i.e., conditions S2 through S5), it has conventionally been necessary to stop the information processing system 10 since there is no rationale for selecting either the 0-series processing apparatus 20 or the 1-series processing apparatus 30, hence reducing the availability of the information processing system 10.

Contrary to the above, if the input/output information 24 and 34 are judged as a nonidentity in the step 103 (i.e., conditions S2 through S5), the processing of the present embodiment refers to the power source error signal 23a to confirm a power source voltage fluctuation error for the 0-series processing apparatus 20 on one end (step 104) and, if there is an error, refers to the power source error signal 33a for the 1-series processing apparatus 30 on the other end to confirm a fluctuation error of power source voltage for the 1-series processing apparatus 30 (step 109) and, if there is no error, select the input/output information 34 relating thereto as the input/output data 51 (i.e., isolate the 0-series processing apparatus 20 from the information processing system 10) and connect to the peripheral system 60 (step 110) (i.e., condition S4).

Meanwhile, if the judgment in the step 104 is that there is no fluctuation error of the power source voltage for the 0-series processing apparatus 20, then refer to the power source error signal 33a for the 1-series processing apparatus 30 on the other end to confirm a power source voltage fluctuation error therefor (step 105) and, if there is an error, select the input/output information 24 relating to the 0-series processing apparatus 20 (i.e., isolate the 1-series processing apparatus 30 from the information processing system 10 and continue the operation (step 111) (i.e., condition S3).

Conversely if a power source voltage fluctuation error is not detected for the 1-series processing apparatus 30 in the step 105, the power source voltages for both the 0-series processing apparatus 20 and 1-series processing apparatus 30 are normal, in which case both the 0-series processing apparatus 20 and the 1-series processing apparatus 30 are judged to be in error (step 106) (i.e., condition S2).

Likewise, if a power source voltage fluctuation error is detected for the 1-series processing apparatus 30 in the step 109, meaning fluctuation errors of power source voltage being detected for both the 0-series processing apparatus 20 and the 1-series processing apparatus 30, both of the 0-series processing apparatus 20 and 1-series processing apparatus 30 are judged to be in error (step 106) (i.e., condition S5).

In the meantime, if the judgment is "no" in the above described step 101, that is, if at least either the internal error signals 26 or 36 is "true", it is judged whether or not there is a double fault, i.e., both the 0-series processing apparatus 20 and 1-series processing apparatus 30 being at fault (step 107) and, if both are at fault, then branch to the step 106 (i.e., condition S8).

Also in the step 107, if either one of the 0-series processing apparatus 20 or 1-series processing apparatus 30 is judged to be at fault, select the non-faulting processing apparatus of the 0-series processing apparatus 20 or 1-series processing apparatus 30 to continue the processing (step 108) (i.e., condition S6 or S7). If the judgment in the above describe step 102 is a "no", the condition is the same.

As described thus far, in the information processing system 10 comprising a plurality of the 0-series processing apparatuses 20 and 1-series processing apparatuses 30 performing the equivalent operation, if the-input/output information 24 and 34 out of the 0-series processing apparatuses 20 and 1-series processing apparatuses 30 raise a nonidentity whereas no error has been detected in either of the two series of processing apparatuses, it is possible to isolate a processing apparatus for which a power source voltage fluctuation error is detected, by interpreting that a fault has occurred therein, and continue to operate the information processing system by using a processing apparatus of the other series by referring to the power source error signals 23a and 33a output from the power source monitor apparatuses 23 and 33, respectively, for monitoring voltage fluctuation in the power sources 22 and 32 equipped for each of the 0-series processing apparatus 20 and 1-series processing apparatus 30, respectively, according to the present embodiment. Therefore, the availability of the information processing system 10 is improved.

Note that the above description exemplifies the case in which the power source monitor apparatuses 23 and 33 judge fluctuations of power source voltage for the power sources 22 and 32, respectively, by using the voltage fluctuation detection threshold value Vt, but the present invention is not limited as such.

For instance, it is possible to use a method for comparing magnitudes of fluctuation of power source voltage between the power sources 22 and 32 within the range of the rated voltage V0 and CPU operable voltage Va and judging the power source with the smaller fluctuation as normal while the other with a larger fluctuation as in a state of error.

According to the present invention, in an information processing system aiming at a high reliability by making a redundantly comprised plurality of processing apparatuses perform an equivalent operation, it is possible to improve availability of the information processing system under such a condition that the processing results of the plurality of processing apparatuses raise a nonidentity whereas a fault has not been detected in either thereof.

Incidentally, it goes without saying that the present invention is in no way limited by the above described embodiment, but can be varied in ways within the scope of the invention.

What is claimed is:

1. A control method for an information processing system comprising a first processing apparatus and a second processing apparatus that perform mutually equivalent processing, and a voltage monitor unit that detects power source voltage for each of the first processing apparatus and the second processing apparatus and that outputs a voltage monitor signal, the method comprising:
   - referring to the voltage monitor signal for each of the first and second processing apparatuses output from the voltage monitor unit;
   - comparing a fluctuation in power source voltage for the first processing apparatus and a fluctuation in power source voltage for the second processing apparatus; and
   - isolating either of the first or second processing apparatuses for which the fluctuation in power source voltage is relatively larger than the other processing apparatus, when respective output data from the first processing apparatus and the second processing apparatus are not identical to each other.

2. A control method for an information processing system which makes first and second processing apparatuses perform the same information processing, the method comprising:
   - judging whether or not conditions of both of the first processing apparatus and the second processing apparatus are normal;
   - judging whether or not respective outputs from the first processing apparatus and the second processing apparatus are identical, when it is judged that both the first processing apparatus and the second processing apparatus are normal;
   - comparing fluctuations in power source voltage for the first processing apparatus and the second processing apparatus, when it is determined that the outputs from the first processing apparatus and the second processing apparatus are not identical; and
   - using either the first processing apparatus or the second processing apparatus in which a fluctuation in power source voltage is determined to be normal.

3. The control method for an information processing system according to claim 2, wherein
   the conditions of the first processing apparatus and the second processing apparatus are judged by determining an internal error of each of the first processing apparatus and the second processing apparatus, and an ECC check error or parity check error relating to input/output data corresponding to each of the first processing apparatus and the second processing apparatus.

4. An information processing system, comprising:
   a plurality of processing apparatuses;
   a voltage monitor unit that monitors a fluctuation in power source voltage for each of the processing apparatuses; and
   a selection unit that switches between a first processing apparatus and a second processing apparatus among the plurality of processing apparatuses, wherein
   the selection unit comprises
   a first judgment unit that judges whether or not respective outputs from the first processing apparatus and the second processing apparatus are identical; and
   a second judgment unit that selects either the first processing apparatus or the second processing apparatus in which the fluctuation in power source voltage is determined to be normal based on monitoring of the fluctuation in power source voltage by the voltage monitor unit, when the first judgment unit judges that the respective outputs of the first processing apparatus and the second processing apparatus are not identical.

5. The information processing system according to claim 4, wherein
   the second judgment unit selects either the first processing apparatus or the second processing apparatus in which the fluctuation in power source voltage is relatively smaller than the other processing apparatus.

6. The information processing system according to claim 4, further comprising:
   a third judgment unit that judges whether or not error check items relating to the first processing apparatus and the second processing apparatus are normal;
   wherein the first judgment unit judges whether or not respective outputs from the first processing apparatus and the second processing apparatus are identical, when the third judgment unit has judged that any of the error check items was not normal.

7. The information processing system according to claim 6, wherein
   said error check items used by said third judgment unit include an internal error of each of said first and second processing apparatuses, and an ECC check error or parity check error relating to input/output data corresponding to each of the first processing apparatus and the second processing apparatus.

* * * * *